United States Patent [19]
Peterson

[11] 3,868,800
[45] Mar. 4, 1975

[54] PANEL JACK CONNECTOR
[75] Inventor: David A. Peterson, Ames, Iowa
[73] Assignee: Iowa State University Research Foundation Inc., Ames, Iowa
[22] Filed: Dec. 3, 1973
[21] Appl. No.: 421,250

[52] U.S. Cl............... 52/285, 52/122, 52/584, 52/753 C
[51] Int. Cl............... E04b 1/48, E04c 1/10
[58] Field of Search...... 52/582, 584, 753 C, 753 D, 52/753 Y, 285, 580, 122

[56] References Cited
UNITED STATES PATENTS
| | | | |
|---|---|---|---|
| 1,863,723 | 6/1932 | Levene | 52/584 |
| 2,376,279 | 5/1945 | Schlenkert | 52/98 |
| 2,915,791 | 12/1959 | Hauf | 52/753 Y |
| 2,962,133 | 11/1960 | Kivett et al. | 52/584 |

FOREIGN PATENTS OR APPLICATIONS
| | | | |
|---|---|---|---|
| 1,033,394 | 7/1958 | Germany | 52/582 |
| 1,387,499 | 12/1964 | France | 52/584 |

Primary Examiner—Henry C. Sutherland
Attorney, Agent, or Firm—Zarley, McKee, Thomte & Voorhees

[57] ABSTRACT

A jack connector is disclosed for detachably securing together at least a pair of spaced apart panels. The connector comprises a minimum of first and second spaced apart connector arms having opposite ends which terminate adjacent to but spaced from the opposite ends of the other connector arm. First and second receiver means secure the opposite ends of the inserted connector arms by screw members extending therethrough for threadable attachment to the adjacent edge portions of the panel. An elongated bolt member extends through one of the connector arms and is threadably received by the other connector arm so that threadable rotation of the bolt member will cause relative movement of the opposite ends of the connector arms. A modified form of the invention is also disclosed for joining the adjacent edges of from two to four panels.

7 Claims, 6 Drawing Figures

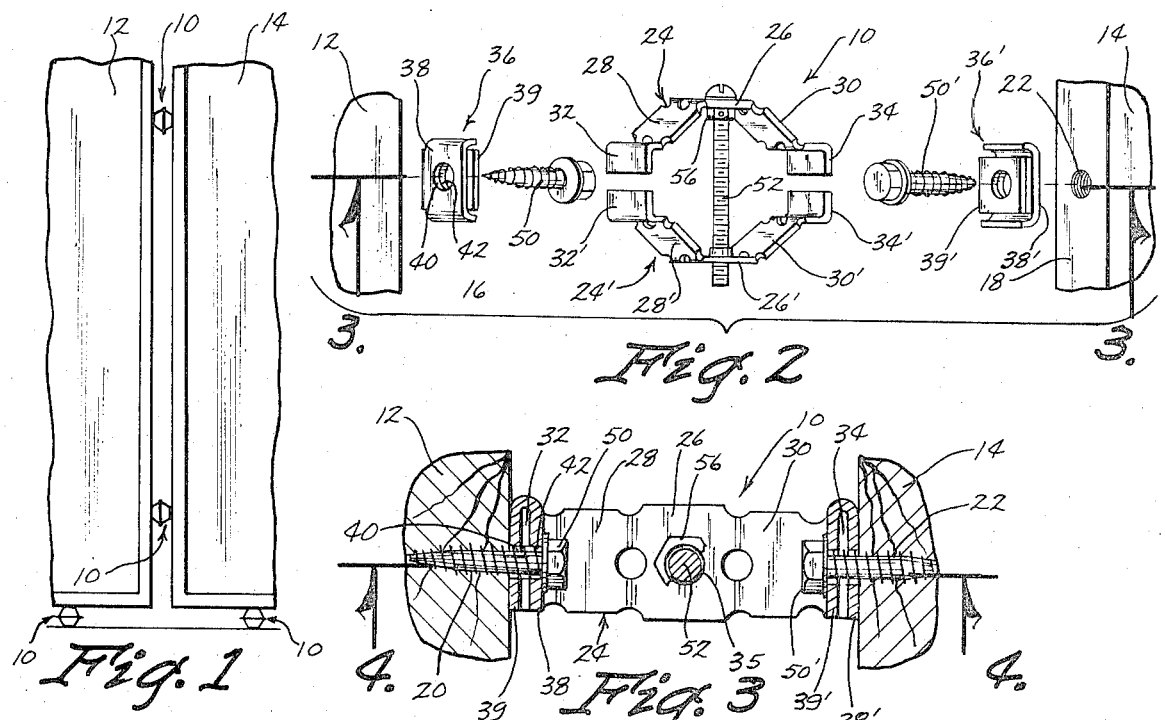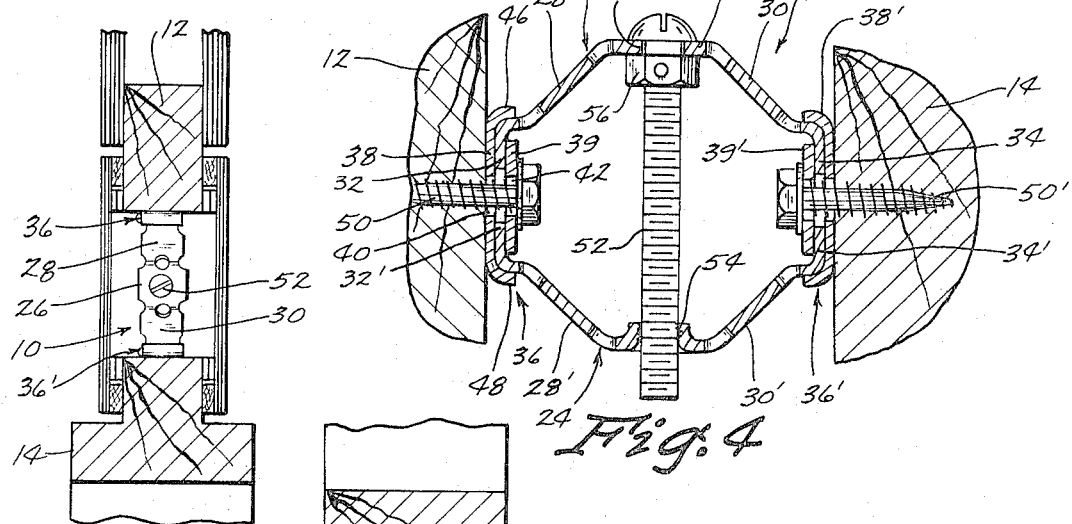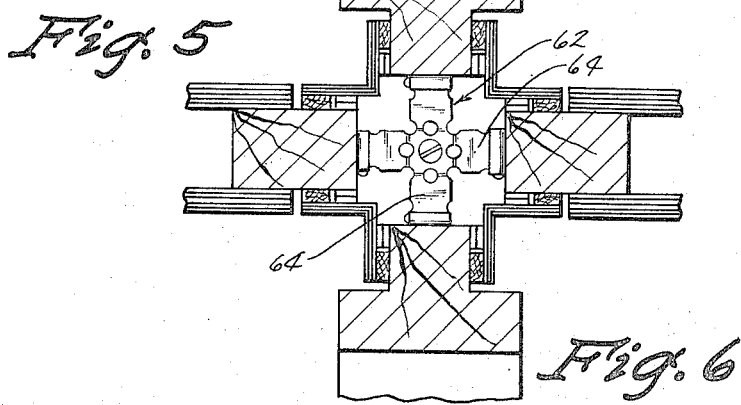

PANEL JACK CONNECTOR

BACKGROUND OF THE INVENTION

This invention pertains to a connector that will permit independent connection and disconnection of structural or non-structural elements used in building construction, and more particularly to a connector that will permit independent connection and disconnection of one or more non-structural panel members. The main desirability of the connector is to permit any number of assembled construction elements to be independently disassembled for alteration or complete change, as the changing requirements of the user dictate, without damage to or destruction of the elements or the connector itself.

A further object of the invention is to provide a panel jack connector which is economical of manufacture, durable in use and refined in appearance.

These and other objects will be apparent to those skilled in the art.

SUMMARY OF THE INVENTION

A panel jack connector is provided that includes a minimum of two spaced apart connector arms which are selectively moved towards and away from each other by a threaded bolt extending therebetween so that the "slotted" receivers on the connector arms may be moved relatively to each other. A screw extends through each of the receivers into the adjacent edge portions of the panels. A modified form of the connector is also disclosed for joining a plurality of panels together.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a partial plan view of a pair of panel members having the jack connectors of this invention installed therebetween:

FIG. 2 is an exploded perspective view of the panel jack connector of this invention:

FIG. 3 is a sectional view seen on lines 3 — 3 of FIG. 2:

FIG. 4 is a sectional view seen on lines 4 — 4 of FIG. 3:

FIG. 5 is a top view of the jack connector secured to a pair of panels; and

FIG. 6 is a top view of a modified form of the invention.

The problem of joining structural elements has two main aspects. The first aspect is the configuration of the joint which determines the relationship of the elements to each other. The second aspect is the design of the connector which determines how the elements are locked together. The stability or flexibility of a joint may be determined by either joint configuration or by connector design, or by a combination of the two. Other affected factors are the ease of manufacture, ease of connection and disconnection, load transfer capability, accomodation of thermal expansion and contraction, weather sealing ability, and appearance of the joint.

Therefore, it is a principal object of the invention to provide an improved connector for joining adjacent panels.

A further object of the invention is to provide a jack connector which is easily installed and easily removed.

A further object of the invention is to provide a jack connector which can be adjusted to compensate for relatively gross dimensional inaccuracies of the panels.

A further object of the invention is to provide a jack connector which can transfer loads and forces through the connector.

A further object of the invention is to provide a jack connector which may be selectively adjusted to exert neutral, tensile or compressive forces on the panels and surrounding structure.

A further object of the invention is to provide a jack connector which may be employed beneath conventionally hung drop ceilings.

A further object of the invention is to provide a jack connector which is capable of joining various sizes of panels of the same thickness into a rigid plane which will resist forces acting normal to their surfaces.

DESCRIPTION OF THE PREFERRED EMBODIMENTS

The numeral 10 refers generally to the jack connector of this invention while the numerals 12 and 14 refer generally to adjacent panels such as commonly used in modular construction. For purposes of description, panels 12 and 14 will be described as having edge portions 16 and 18 respectively. Ordinarily, the edge portions 16 and 18 would be provided with a plurality of threaded openings 20 and 22 formed therein. However, it is not necessary that openings 20 and 22 be provided since self-tapping screws are employed as will be described in more detail hereinafter.

Connector 10 comprises generally a pair of connector arms 24 and 24'. For purposes of description, connector arm 24 will be described as comprising a central portion 26, depending legs 28 and 30, and end portions 32 and 34. As seen in FIG. 4, connector arm 24 is provided with notches or cut-out portions which facilitates the bending thereof. Central portion 26 is provided with an opening 35 as will be described in more detail hereinafter. Connector arm 24' comprises a central portion 26', depending legs 28' and 30', and end portions 32' and 34'. Connector arm 24' is also provided with a plurality of notches or cut-out portions to facilitate the bending thereof.

The numeral 36 refers to a receiver means comprising generally a plate bent upon itself to define plate members 38 and 39 having openings 40 formed therein respectively. As seen in FIG. 4, plate member 38 includes arcuate end portions 46 and 48 which are adapted to embrace the ends of the collector arms 24 and 24'. The numeral 50 refers to a self-tapping screw which is adapted to extend through the opening 42 in plate member 39 and opening 40 in plate member 38 as will be described in more detail hereinafter. The numeral 36' refers to a receiver means which is identical to receiver means 36 and which is adapted to be installed on the other ends of the collector arms as seen in the drawings. Screw 50' extends through the plate members 39 and 38 as seen in FIG. 4. Bolt 52 extends through opening 35 in central portion 26 and is threadably received by the internal threads 54 in collector arm 24'. Lock nut 56 is mounted on the bolt 52 inwardly of central portion 26 as seen in FIG. 4.

When it is desired to connect the panels 12 and 14, the receiver means 36 and 36' would be loosely mounted in the openings 20 and 22 by means of the screws 50 and 50'. The end portions 32 and 32' of the collector arms 24 and 24' are then slipped between the plate members 38 and 39 in the manner illustrated in FIG. 4. Screw 50 is then tightened with a suitable box-end wrench. Bolt 52 is then threadably rotated, if necessary, to close or spread the other ends of the connector arms 24 and 24' so that the end portions 34 and 34' may be easily received by the receiver means 36' which is mounted on the panel 14. The screw 50' is then tightened by means of an ordinary box wrench. After both panels are connected by the connectors 10, the amount of adjustment required may be determined by using a measuring gauge between the panel edges. Corrective adjustment for dimensional irregularities may be quickly done before the last panel of a section is installed. The bolt 52 in each of the connectors permits precise adjustment of the connector so as to achieve the proper alignment of the respective panels. Any number of connectors may be used between the adjacent panels as required to achieve the necessary stability and rigidity.

The connector arms of the connectors may be bent completely out of the way when one of the panels has been removed to achieve the necessary clearance space. FIG. 5 illustrates the connector in position with suitable covers 58 and 60 having been installed on the panels to hide the connectors so as to present a pleasing appearance.

FIG. 7 illustrates a modified form of the embodiment referred to generally by the reference numeral 62. The connector 62 is identical to the connector 10 except that the device is adapted to join two or more panels together as illustrated in FIG. 6. Connector 62 includes a pair of connector arms 64, each of which have four depending legs rather than two depending legs as in connector 10.

Thus it can be seen that a novel jack connector has been provided for securing together adjacent panels. The connectors are easily installed between the panels and are adjustable to compensate for irregularities in the panel. Either of the panels may be easily removed without disassembling the entire structure as is the case in certain of the prior art devices. Thus it can be seen that the jack connector of this invention accomplishes at least all of its stated objectives.

I claim:

1. A connector for joining adjacent panels having spaced apart adjacent edge portions, comprising, a first connector arm having first and second ends, a second connector arm having first and second ends and being spaced apart from said first connector arm, a first receiver means removably secured to the first ends of said first and second connector arms, a second receiver means removably secured to the second ends of said first and second connector arms, first and second screw members extending through said first and second receiver means respectively for threadable insertion into the adjacent edge portions of the panels, a length adjustable member connected to said first and second connector arms and extending therebetween for selectively moving the first ends of said first and second connector arms with respect to the second ends of said first and second connector arms, said first ends of said first and second connector arms being parallel to the edge portion of the adjacent panel, said first ends being spaced apart to define an opening therebetween, said second ends of said first and second connector arms being parallel to the edge portion of the adjacent panel, said second ends being spaced apart to define an opening therebetween, said screw members extending through said openings and through said receiver means, said first and second ends of said connector arms having inner and outer sides, each of said receiver means comprising plate means bent upon itself to form first and second plate members having substantally a U-shaped configuration, said first and second plate members being positioned on opposite sides of the ends of the connector arms.

2. A connector for joining adjacent panels having spaced apart adjacent edge portions, comprising, a first connector arm having first and second ends, a second connector arm having first and second ends and being spaced apart from said first connector arm, a first receiver means removably secured to the first ends of said first and second connector arms, a second receiver means removably secured to the second ends of said first and second connector arms, first and second screw members extending through said first and second receiver means respectively for threadable insertion into the adjacent edge portions of the panels, and a bolt member rotatably mounted in said first connector arm and threadably connected to said second connector arm so that selective rotation of said bolt member causes the first ends of said first and second connector arms to be moved with respect to the second ends of said first and second connector arms to permit the adjacent edge portions of the panels to be adjustably moved towards and away from one another.

3. The connector of claim 2 wherein the first ends of said first and second connector arms are parallel to the edge portion of the adjacent panel, said first ends being spaced apart to define an opening therebetween, said second ends of said first and second connector arms being parallel to the edge portion of the adjacent panel, said second ends being spaced apart to define an opening therebetween, said screw members extending through said openings and through said receiver means.

4. The connector of claim 1 wherein said first plate member of each of said receiver means has arcuate end portions which partially embrace the ends of said connector arms.

5. The connector of claim 1 wherein each of said plate members of each of said receiver means has an opening formed therein to permit the screw member to extend therethrough.

6. The connector of claim 2 wherein said connector arms have notches formed therein to facilitate the bending thereof.

7. A connector for joining adjacent panels having spaced apart adjacent edge portions, comprising,
   a first connector arm having first, second, third and fourth transversely disposed depending legs,
   a second connector arm having first, second, third and fourth transversely disposed depending legs,
   the ends of the legs of said first connector arm being disposed adjacent to but spaced from the ends of the legs of said second connector arm,
   a receiver element removably secured to each of the adjacent ends of said legs,
   a screw element extending through each of said receiver elements for threadable insertion into the adjacent edge portions of the panels,
   and a length adjustable member connected to said first and second connector arms and extending therebetween for selectively moving the adjacent ends of the legs with respect to each other.

* * * * *